United States Patent
Wright et al.

(10) Patent No.: US 7,052,566 B2
(45) Date of Patent: May 30, 2006

(54) METHOD OF MANUFACTURING A DECORATIVE PANEL COVER

(75) Inventors: Ian Sutherland Wright, Essex (GB); Gordon Davies, Birmingham, MI (US); Brad Lawes, Warwick (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 429 days.

(21) Appl. No.: 10/360,300

(22) Filed: Feb. 7, 2003

(65) Prior Publication Data

US 2003/0168151 A1 Sep. 11, 2003

(30) Foreign Application Priority Data

Feb. 8, 2002 (EP) ................................. 02250861

(51) Int. Cl.
- *B32B 37/30* (2006.01)
- *B29C 51/02* (2006.01)
- *B29C 65/62* (2006.01)
- *B29C 65/72* (2006.01)

(52) U.S. Cl. .................. 156/93; 156/245; 156/258; 428/104; 264/152

(58) Field of Classification Search .................. 156/93, 156/263, 261, 222, 224, 91, 92, 245, 256, 156/258, 285; 2/275; 264/145, 152, 157, 264/160; 428/104, 102; 296/187.05, 191, 296/193.05, 70

See application file for complete search history.

(56) References Cited

U.S. PATENT DOCUMENTS

| | | | | |
|---|---|---|---|---|
| 455,381 | A * | 7/1891 | Beeman ........................ | 156/93 |
| 1,136,380 | A * | 4/1915 | Terry ............................ | 428/62 |
| 3,010,114 | A * | 11/1961 | Lipschultz ................... | 428/103 |
| 3,611,500 | A * | 10/1971 | Carrigan ...................... | 425/303 |
| 4,711,190 | A * | 12/1987 | Smith ...................... | 112/475.23 |
| 4,778,551 | A * | 10/1988 | Coffman ...................... | 156/224 |
| 5,116,079 | A | 5/1992 | Rhodes, Jr. | |
| 5,181,980 | A * | 1/1993 | Yanagishita .................. | 156/93 |
| 5,395,473 | A * | 3/1995 | Nixon ......................... | 156/291 |
| 5,573,617 | A * | 11/1996 | Franck et al. ............... | 156/196 |

FOREIGN PATENT DOCUMENTS

GB 2046171 A * 11/1980

* cited by examiner

*Primary Examiner*—Gladys J P Corcoran
(74) *Attorney, Agent, or Firm*—Brinks, Hofer, Gilson & Lione

(57) ABSTRACT

This invention relates to a decorative panel cover and to a method of manufacturing a decorative panel cover. The invention provides a method of manufacturing a decorative panel comprising the steps of molding a first cover material to produce a first molded cover. Molding a second cover material to produce a second molded cover. A seam is formed when the first molded cover is attached to the second molded cover. In order to further enhance the aesthetic look of the decorative panel cover, topstitching is applied to one side of the seam.

6 Claims, 3 Drawing Sheets

METHOD OF MANUFACTURING A DECORATIVE PANEL COVER

PRIORITY CLAIM

This application claims benefit of European Patent Application No. 02250861.8, filed with the European Patent Office on Feb. 8, 2002.

TECHNICAL FIELD

This invention generally relates to a method of manufacturing a decorative panel cover and particularly to a decorative panel cover having a seam.

BACKGROUND

Interior components in an automobile are often produced as a series having different specifications, where a high specification automobile uses an interior part with a high specification, and a low specification vehicle uses an interior part having a low specification. One example of this is where a stitch line is applied to components of a series with a high specification in order to give a 'hand crafted' appearance to those components. Such a stitch line is usually intended to appear as if it is required for the manufacture of the part, but in fact it is usually merely decorative.

In order to produce a hand stitched appearance, conventionally, a molded substrate is produced which defines the shape of the required component, for example an instrument panel or console, or a door trim. A cover material, for example poly vinyl chloride (PVC) or thermoplastic polyolefin (TPO) is cut into parts of appropriate shapes according to a pattern in a similar manner to the method used when making a garment. The parts are then sewn together to form the shape required to clad the molded substrate. The completed cover is then placed over the substrate and bonded in place. A foamed material may be used between the substrate and the cover in order to achieve a soft feel for the component and this foamed material which may act as a bonding agent.

Disadvantages of this conventional process are that the process is very labor intensive, and thus it is impractical to produce parts with such an appearance in large volumes. Furthermore, the process involves stretching the skin after the parts have been sewn together, which may create a weakness along the stitch line.

Therefore, there is a need in the automotive interior industry to produce in large quantities, decorative cover that have the appearance that the part has been handcrafted.

SUMMARY

According to the invention, a method of manufacturing a decorative cover for a panel is provided. The method comprises the steps of molding a first cover material to produce a first molded cover. Molding a second cover material to produce a second molded cover. Attaching the first molded cover to the second molded cover to form a seamed molded cover with a seam and topstitching the seamed molded cover on at least one side of the seam.

In yet another aspect of the invention the first molded cover and the second molded cover are produced by separating a single molded cover into two parts.

In yet another aspect of the invention the first molded cover is produced by separating a first molded cover into two parts and the second molded cover is produced by separating a second molded cover into two parts.

In yet another aspect of the invention the method further comprises the step of sealing the seam by bonding a reinforcing strip along the inside of the seam.

BRIEF DESCRIPTION OF THE DRAWINGS

Embodiments of the invention will now be described, by way of example only, with reference to the accompanying drawings, in which.

DETAILED DESCRIPTION

The following description of the preferred embodiment is merely exemplary in nature and is in no way intended to limit the invention or its application or uses.

Figure 1:
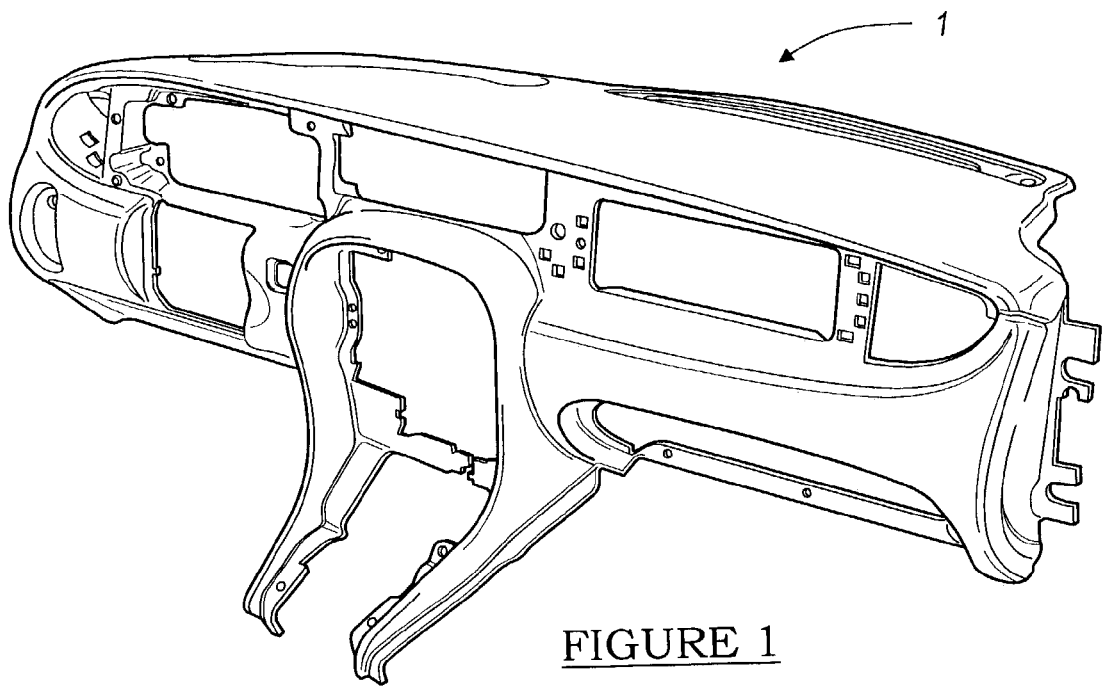
FIG. 1 represents a substrate such as an instrument panel.
Figure 2:
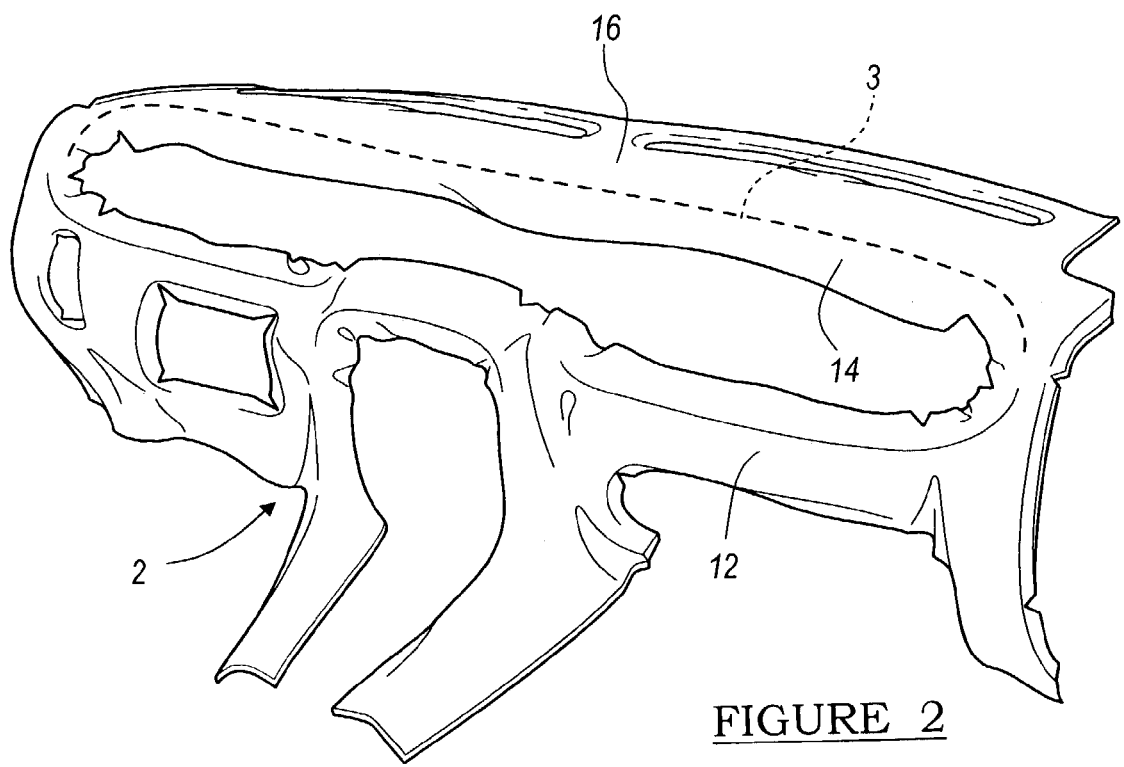
FIG. 2 illustrates a molded decorative cover attached to the substrate marked where cuts are to be performed.

Referring in particular to FIGS. 1 and 2, a substrate, such as an instrument panel, is generally shown and represented by reference number 1. Although in the drawings an instrument panel is shown, it must be understood that the substrate 1 can be any interior part of a motor vehicle for example, door trim panel, a console, or a roof panel. Preferably, the substrate 1 is formed of plastic or any other suitable material such as composite material.

In order to give the substrate 1 a plush and an aesthetic appearance, the substrate 1, is covered with a decorative cover 2 (as shown in FIG. 2) to form a decorative instrument panel. The decorative cover 2 is formed from a sheet of material (not shown) such as Poly Vinyl Chloride (PVC). Other materials which may be used include a laminate material, Thermal Polymer Olefin (TPO) or a natural fiber mat mixed with polypropylene fibers. Alternately, other materials such as polypropylene or combinations of thermoplastic materials can be used.

Figure 3:
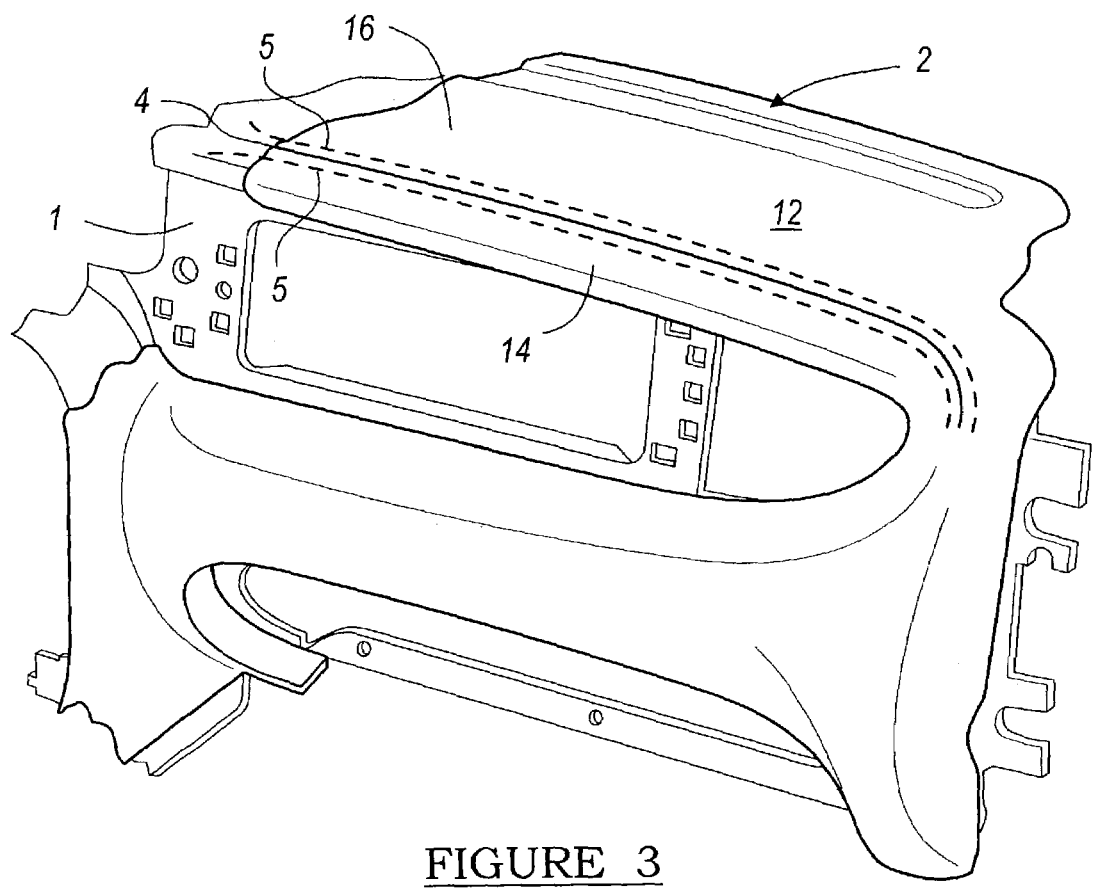
FIG. 3 illustrates a seamed decorative cover as attached to the substrate to form a decorative instrument panel.
Figure 4:
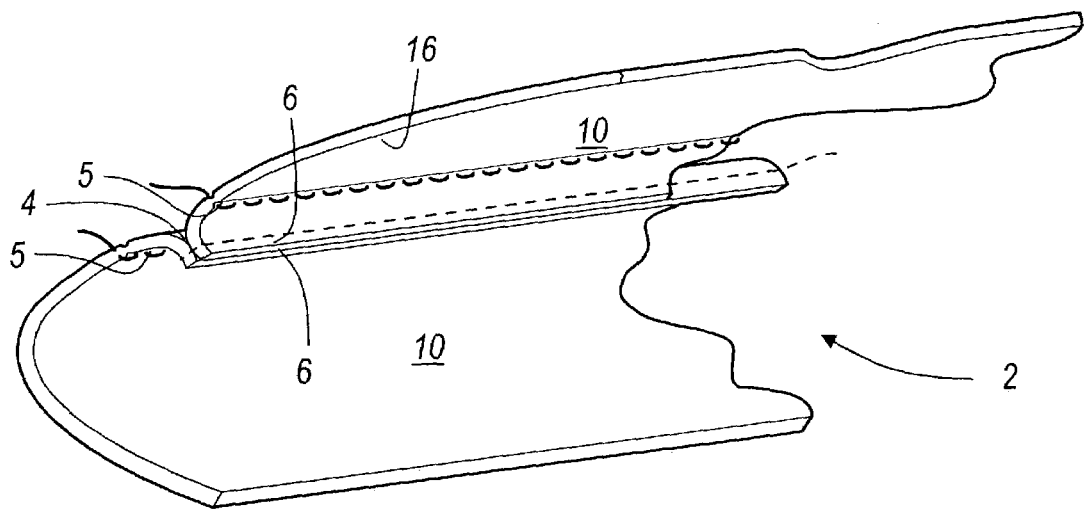
FIG. 4 shows the reverse side of the seamed decorative cover.

The sheet of material is then cut to the desired shape to conform to the shape of the substrate 1. The cut sheet of material is then vacuum formed into the three-dimensional shape required to form the decorative cover 2. In an alternative embodiment the decorative cover 2 is produced by the process of slush molding. The decorative cover 2 defines a first surface 10 (as shown in FIG. 4) and a second surface 12 (shown in FIG. 2) opposite the first surface 10. The first surface 10 of the decorative cover 2 is preferably attached to the substrate 1. References to first surface 10 and second surface 12 are only to reference the surface that is attached to the substrate 1 and is no way intended to limit this application, Referring in particular to FIGS. 2 and 3 in order to enhance the aesthetic look of the interior of the motor vehicle and to give an appearance that the decorative cover 2 is "hand manufactured" or custom manufactured, the decorative cover 2 is provided with a stitch line or a seam 4. The seam 4 is formed by cutting a portion (as shown by dotted lines 3 in FIG. 2) of the decorative cover 2 such that the decorative cover 2 defines a first part 14 and a second part 16.

After the decorative cover 2 has been cut at portions marked 3, the first part 14 and the second part 16 of the decorative cover 2 are stitched to each other to form the seam 4. Preferably, the first part 14 and the second part 16 of the decorative cover 2 are stitched on the first surface 10 such that the seam 4 appears on the second surface 12 (as shown in FIG. 3). As shown in FIG. 4, any excess material shown by reference numeral 6 preferably is folded away from the seam 4 on the first surface 10 of the decorative cover 2 such that it is not visible to the occupant of the motor vehicle.

Referring in particular to FIGS. 3 and 4, in order to further enhance the aesthetic appearance of the decorative cover 2, topstitching 5 is applied to at least one side of the seam 4. Preferably, topstitching 5 is applied to both sides of the seam 4. FIG. 3 illustrates the appearance of a seam 4 which has had topstitching 5 applied at either side of the seam 4.

Figure 6:
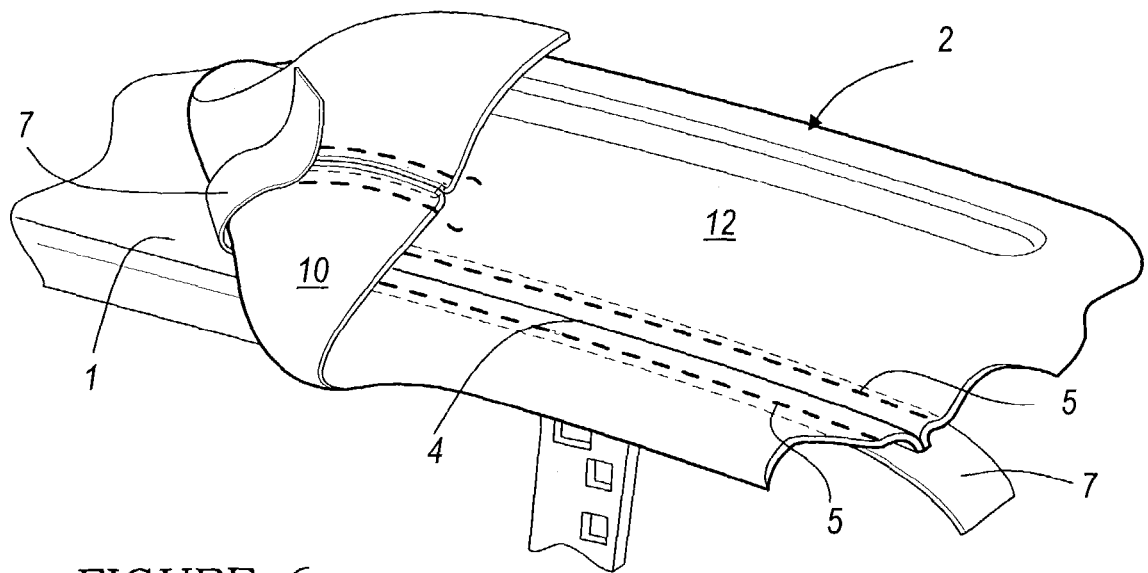
FIG. 6 illustrates a reinforcing strip attached to the decorative cover.

Referring in particular to FIG. 6, in order to reinforce the seam 4, the decorative cover 2 is provided with a strip of reinforcing tape 7 on the first surface 10. As shown in FIG. 6, the strip of reinforcing tape 7 is bonded to the first surface 10 of the decorative cover 2 before the topstitching 5 is applied such that the reinforcing tape 7 is stitched to the decorative cover 2. When the reinforcing tape 7 is bonded before topstitching 5 is applied, it is important to cover the topstitching holes before the decorative cover with the seam is attached to the substrate 1. Alternatively, the reinforcing tape 7 may be applied after the step of topstitching.

Although not shown in the drawings, it is also possible to form a decorative cover with a seam that is formed from two identically shaped molded covers. The identical shaped molded covers are cut in slightly different places in each case. The cuts are made such that when one part of the first molded cover is attached to a second part of the second molded cover.

The decorative cover 2, with the seam 4, is then subject to conventional process to form an instrument panel. Such steps include placing the decorative cover 2 with the seam in a forming tool with the molded substrate 1 and attaching the decorative cover 2 to the substrate 1. The resulting instrument panel gives the appearance of being "hand crafted" or custom made.

Figure 5:
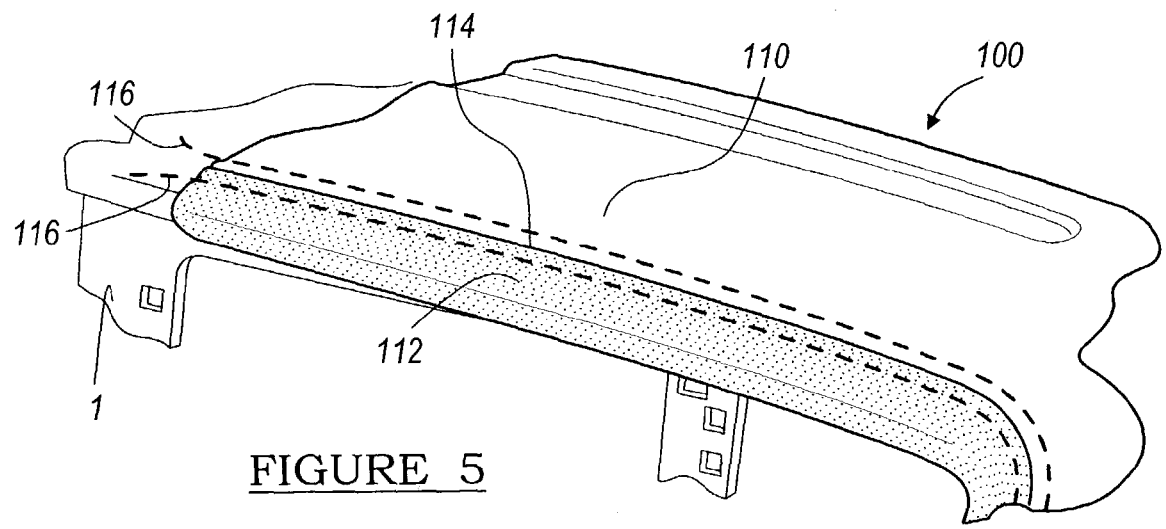
FIG. 5 illustrates a two tone seamed decorative cover.

FIG. 5 represents an alternate embodiment of the decorative cover 2. As shown, the decorative cover 100 can be formed by two separate decorative covers that are sewed together to give the substrate a twin color molded panel. As shown in the Figure, the decorative cover 100 is formed by sewing together a first decorative cover 110 made by molding a first material and a second decorative cover 112 made by molding a second material. A seam 114 is defined at the location where the first decorative cover 110 is attached to the second decorative cover 112. Like the previous embodiment, topstitching 116 is then applied to either side of the seam 114.

The above described method of forming a decorative cover 2 with a seam 4 has numerous advantages. For example, the same tools can be used for decorative covers with or with out the seam. Additionally, the position of the seam 4 can be modified for different models of automobiles or for models produced in different years without requiring any tooling changes. Additionally, the invention is not limited to manufacturing molded parts which are made from decorative covers manufactured using a single tool. A different tool may be used for creating each of the first and second decorative cover parts, which are then attached together and a decorative top stitch applied to one or both sides of the resulting seam. The molded cover produced according to the invention is then used in a conventional process to manufacture a decorative panel. For example the molded cover may be placed in a foaming tool along with a molded substrate, such as that shown in FIG. 1, to produce a finished decorative component.

As any person skilled in the art will recognize from the previous description and from the figures and claims, modifications and changes can be made to the preferred embodiment of the invention without departing from the scope of the invention as defined in the following claims.

What is claimed is:

1. A method of manufacturing a decorative cover for a panel of a motor vehicle, the method comprising:
   molding a cover material to form a molded cover;
   forming a cut in the molded cover to define a first part and a second part connected to each other at an end of the cut;
   attaching the first part to the second part along the cut, thereby forming a seam; and
   topstitching adjacent to the seam on at least one side of the first and second parts.

2. The method of claim 1, wherein the step of attaching is performed by stitching the first part to the second part.

3. The method of claim 1, further comprising sealing the seam by bonding a reinforcing strip along an inside portion of the seam.

4. The method of claim 3, wherein the reinforcing strip is bonded before topstitching the seamed cover.

5. The method of claim 3, where in the reinforcing strip is bonded after topstitching the seamed cover.

6. The method of claim 1, wherein the molded cover material is selected from a group consisting of polyvinyl chloride, colored polypropylene, thermal polymer olefin or natural fibers mixed with polypropylene fibers.

* * * * *